(12) United States Patent
Barbara et al.

(10) Patent No.: US 9,191,364 B2
(45) Date of Patent: Nov. 17, 2015

(54) EXTENSIBLE FRAMEWORK FOR COMMUNICATING OVER A FIREWALL WITH A SOFTWARE APPLICATION REGARDING A USER ACCOUNT

(71) Applicant: Okta, Inc., San Francisco, CA (US)

(72) Inventors: Christopher Barbara, San Francisco, CA (US); RaghuRam Pamidimarri, Union City, CA (US)

(73) Assignee: Okta, Inc., San Francisco, CA (US)

( * ) Notice: Subject to any disclaimer, the term of this patent is extended or adjusted under 35 U.S.C. 154(b) by 0 days.

(21) Appl. No.: 14/096,011

(22) Filed: Dec. 4, 2013

(65) Prior Publication Data

US 2014/0096227 A1  Apr. 3, 2014

Related U.S. Application Data

(63) Continuation of application No. 12/943,842, filed on Nov. 10, 2010, now Pat. No. 8,839,408.

(60) Provisional application No. 61/899,103, filed on Nov. 1, 2013.

(51) Int. Cl.
*H04L 29/06* (2006.01)

(52) U.S. Cl.
CPC .............. *H04L 63/02* (2013.01); *H04L 63/20* (2013.01)

(58) Field of Classification Search
CPC .............................. H04L 63/02; H04L 63/20
USPC ......... 726/4–12; 713/153–154, 161, 168, 182
See application file for complete search history.

(56) References Cited

U.S. PATENT DOCUMENTS

| | | | |
|---|---|---|---|
| 6,502,191 B1 * | 12/2002 | Smith et al. ..................... 726/12 |
| 7,735,127 B1 | 6/2010 | Rive et al. |
| 7,899,892 B2 * | 3/2011 | Tremblay et al. ............. 709/221 |
| 8,063,737 B2 | 11/2011 | Connell et al. |
| 8,819,814 B1 | 8/2014 | Leach et al. |
| 2006/0248017 A1 | 11/2006 | Koka et al. |
| 2007/0083245 A1 | 4/2007 | Lamensdorf et al. |
| 2007/0083425 A1 | 4/2007 | Cousineau et al. |
| 2007/0245013 A1 | 10/2007 | Saraswathy et al. |
| 2008/0320572 A1 | 12/2008 | Connell, II et al. |
| 2009/0158302 A1 | 6/2009 | Nicodemus et al. |
| 2013/0019282 A1 * | 1/2013 | Rice et al. ........................ 726/4 |

OTHER PUBLICATIONS

Office Action for U.S. Appl. No. 12/943,842, mailed Sep. 5, 2013, 15 Pages.

(Continued)

*Primary Examiner* — Venkat Perungavoor
*Assistant Examiner* — Amir Mehrmanesh
(74) *Attorney, Agent, or Firm* — Fenwick & West LLP

(57) ABSTRACT

An on-premise software application ("OPA") is communicated with according to an action received from outside a firewall. The action concerns user account information maintained by the OPA. The OPA is installed on a device located inside the firewall. The action is received from a management server located outside the firewall. The action includes a portion that adheres to a standardized format. An OPA interface request is generated based on the action. The OPA interface request includes the standardized portion. The OPA interface request is sent to an agent/OPA interface.

17 Claims, 5 Drawing Sheets

(56) References Cited

OTHER PUBLICATIONS

Drake T. et al., "System for Cross-Domain Identity Management: Protocol 1.1 draft-scim-api-01" Aug. 16, 2012, 47 pages, [retrieved on Oct. 29, 2014] Retrieved from the Internet: <http://tools.ietf.org/pdf/draft-ietf-scim-api-00.pdf>.

International Search Report and Written Opinion for International Application No. PCT/US2014/054912, Dec. 18, 2014, 10 pages.
United States Office Action for U.S. Appl. No. 14/266,426, Nov. 6, 2014, 20 pages.

* cited by examiner

EXTENSIBLE FRAMEWORK FOR COMMUNICATING OVER A FIREWALL WITH A SOFTWARE APPLICATION REGARDING A USER ACCOUNT

RELATED APPLICATIONS

This application claims the benefit of U.S. Provisional Application No. 61/899,103, filed Nov. 1, 2013, which is incorporated by reference herein in its entirety. This application is also a continuation-in-part of U.S. patent application Ser. No. 12/943,842, filed Nov. 10, 2010, which is incorporated by reference herein in its entirety.

BACKGROUND

1. Technical Field

This application generally relates to the field of user account information and, in particular, to an extensible framework for communicating over a firewall with a software application regarding its user accounts.

2. Background Information

A software application that requires a person to log in to an account maintains information regarding each account. Assuming that each person has a separate account, this account information (sometimes referred to as a "user profile") includes, for example, the person's user name, the person's password (or other authentication information), the person's real name, the person's email address, groups of which the person's account is a member, permissions or settings associated with the person's account, and past activity of the person's account. The account information is accessed to manage the accounts, such as provisioning (e.g., creating or activating) an account, deprovisioning (e.g., deactivating or deleting) an account, modifying a user profile, and performing a mass user import (e.g., provisioning many accounts for many different people in a batch process). The account information is also accessed to perform delegated authentication. For example, a user name and password provided by a user can be sent to the application, and the application can determine whether the user name and password are valid (e.g., whether they match a particular user profile).

A particular corporate device user (e.g., an employee, customer, partner, or contractor) often makes use of several software applications, each of which requires a user to log in to an account. Usage of multiple applications by the same user often requires multiple accounts, leading to a proliferation of user accounts and user profiles. As mentioned above, account information is accessed to manage the accounts and to perform delegated authentication. Often, each software application offers a different interface (e.g., a different application programming interface (API)) for accessing its account information. Communicating with several different applications regarding their account information using the various interfaces is very time-consuming for a company's Information Technology (IT) department.

One solution is to use a third-party service to communicate with the software applications regarding their account information. However, it can be a security risk to allow a machine located outside the company's firewall (executing the third-party service) to communicate with a machine located inside the company's firewall (executing an on-premise application). Also, the machine located outside the company's firewall (executing the third-party service) still needs to use different interfaces to communicate with different on-premise applications.

SUMMARY

The above and other issues are addressed by a computer-implemented method, non-transitory computer-readable storage medium, and computer system for communicating with an on-premise software application ("OPA") according to an action received from outside a firewall. The action concerns user account information maintained by the OPA. The OPA is installed on a device located inside the firewall. An embodiment of the method comprises receiving the action from a management server located outside the firewall. The action includes a portion that adheres to a standardized format. The method further comprises generating an OPA interface request based on the action. The OPA interface request includes the standardized portion. The method further comprises sending the OPA interface request to an agent/OPA interface.

An embodiment of the medium stores computer program modules executable to perform steps. The steps comprise receiving the action from a management server located outside the firewall. The action includes a portion that adheres to a standardized format. The steps further comprise generating an OPA interface request based on the action. The OPA interface request includes the standardized portion. The steps further comprise sending the OPA interface request to an agent/OPA interface.

An embodiment of the computer system comprises a non-transitory computer-readable storage medium storing computer program modules executable to perform steps. The steps comprise receiving the action from a management server located outside the firewall. The action includes a portion that adheres to a standardized format. The steps further comprise generating an OPA interface request based on the action. The OPA interface request includes the standardized portion. The steps further comprise sending the OPA interface request to an agent/OPA interface.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
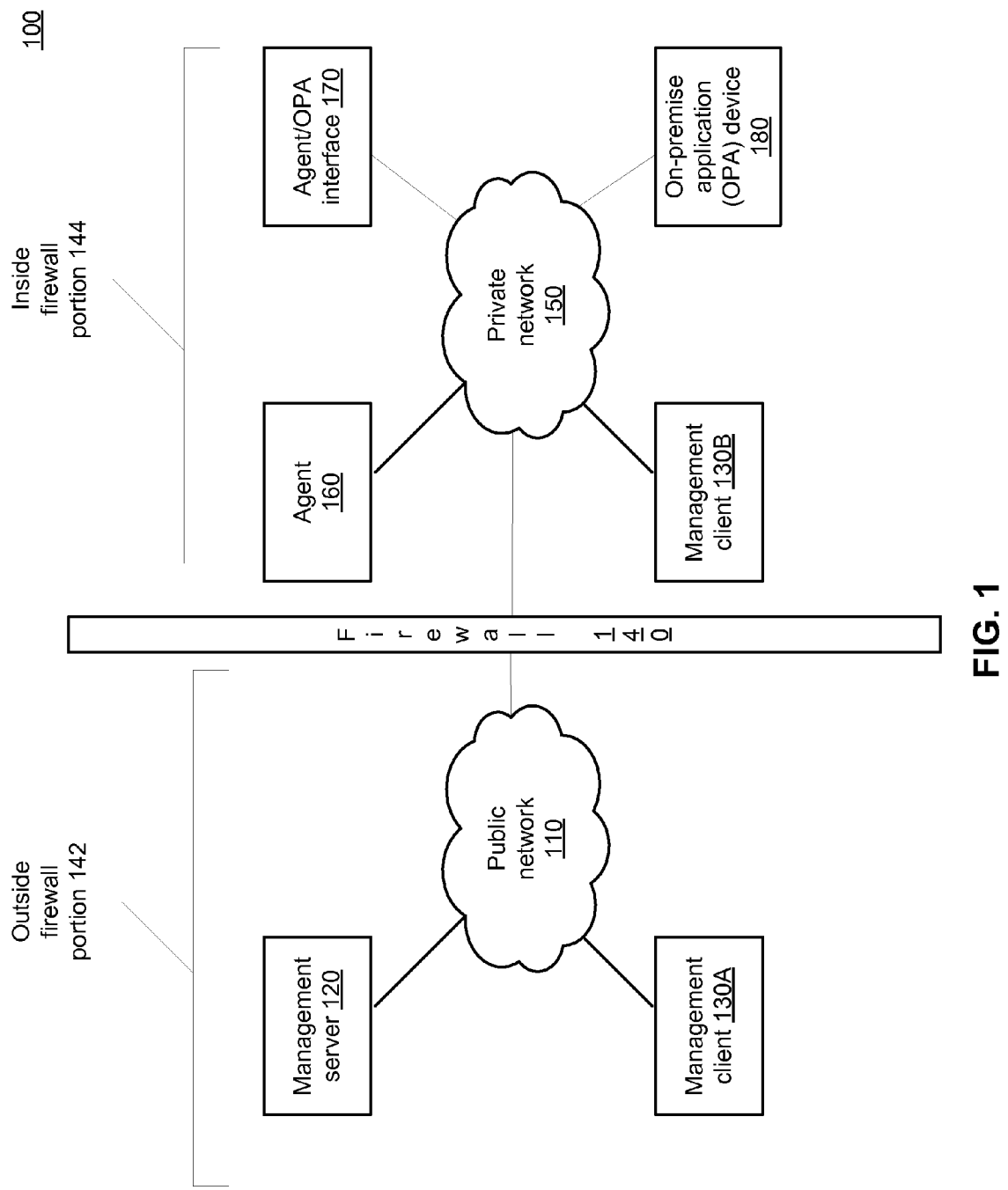
FIG. 1 is a high-level block diagram illustrating an environment for communicating over a firewall with a software application regarding a user account according to an extensible framework, according to one embodiment.

FIG. 1 is a high-level block diagram illustrating an environment 100 for communicating over a firewall with a software application regarding a user account according to an extensible framework, according to one embodiment. The environment 100 may be maintained by one or more enterprises, such as corporations, universities, and/or government agencies. As shown, the environment 100 includes a firewall 140, a public network 110, a management server 120, two management clients 130A and 130B, a private network 150, an agent 160, an agent/on-premise application (OPA) interface 170, and an on-premise application (OPA) device 180.

The firewall 140 is a computer (or set of computers) that divides the environment 100 into two parts: one part that is "inside" the firewall (inside firewall portion 144) and one part that is "outside" the firewall (outside firewall portion 142). In FIG. 1, the inside firewall portion 144 includes the private network 150, the management client 130B, the agent 160, the agent/OPA interface 170, and the OPA device 180. The outside firewall portion 142 includes the public network 110, the management server 120, and the management client 130A.

The firewall 140 controls incoming network traffic (i.e., traffic sent from the outside firewall portion 142 to the inside firewall portion 144) and/or outgoing network traffic (i.e., traffic sent from the inside firewall portion 144 to the outside firewall portion 142). For example, the firewall 140 analyzes data packets and determines whether they should be allowed through the firewall 140. In one embodiment, the firewall 140 limits or prevents certain interactions between the two sides of the firewall. For example, the firewall 140 rejects unsolicited incoming network traffic.

In general, the inside firewall portion 144 is a trusted and secure network (e.g., internal to a particular enterprise), and the outside firewall portion 142 is not assumed to be trusted or secure. In one embodiment, the inside firewall portion 144 is associated with an enterprise that needs to communicate with an on-premise application (OPA) (installed on OPA device 180) regarding its user accounts. Specifically, the enterprise needs to manage the OPA's accounts and/or use the OPA's accounts to perform delegated authentication. The management server 120 represents a third-party service that helps enterprises such as the one associated with the inside firewall portion 144. Specifically, the management server 120 enables the enterprise to more easily manage the OPA's accounts and/or use the OPA's accounts to perform delegated authentication.

In one embodiment, the environment 100 operates as follows: An on-premise application (OPA) is installed on OPA device 180 and maintains account information. A management client 130 sends the management server 120 instructions regarding managing the OPA's accounts and/or using the OPA's accounts to perform delegated authentication. The management server 120 stores the instructions in the form of "actions" for later use. An action includes a portion that adheres to a standardized format. The agent 160 sends the management server 120 a check-in communication. In response to receiving the check-in communication, the management server 120 sends the agent 160 (over the firewall 140) a stored action (including the standardized portion). The agent 160 sends the agent/OPA interface 170 an OPA interface request that corresponds to the action and includes the standardized portion. The agent/OPA interface 170 translates the OPA interface request (including the standardized portion) to a format that the OPA can understand (e.g., commands that adhere to the OPA's application programming interface (API)). The agent/OPA interface 170 then communicates with the OPA device 180 accordingly. Specifically, the agent/OPA interface 170 communicates with the OPA that is installed on the OPA device 180, thereby causing the OPA to execute the commands and, therefore, the action.

The on-premise application (OPA) device 180 is a computer (or set of computers) on which one or more on-premise applications (OPAs) are installed. An OPA requires a user to log in to an account and maintains information regarding each account. Assuming that each person has a separate account, this account information (sometimes referred to as a "user profile") includes, for example, the person's user name, the person's password (or other authentication information), the person's real name, the person's email address, groups of which the person's account is a member, permissions or settings associated with the person's account, and past activity of the person's account. The account information is accessed to manage the accounts, such as provisioning (e.g., creating or activating) an account, deprovisioning (e.g., deactivating or deleting) an account, modifying a user profile, and performing a mass user import (e.g., provisioning many accounts for many different people in a batch process). The account information is also accessed to perform delegated authentication. For example, a user name and password provided by a user can be sent to an OPA, and the OPA can determine whether the user name and password are valid (e.g., whether they match a particular user profile). A particular OPA offers a particular interface (e.g., a particular application programming interface (API)) for accessing that OPA's account information. While only one OPA device 180 is shown in the embodiment depicted in FIG. 1, other embodiments can have multiple OPA devices 180. Multiple OPA devices 180 can be useful, for example, to provide high availability and to handle additional on-premise applications (OPAs).

The public network 110 represents the communication pathway between the management server 120, the management client 130A, and the firewall 140. In one embodiment, the public network 110 uses standard communications technologies and/or protocols and can include the Internet. Thus, the public network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the public network 110 can include multiprotocol label switching (MPLS), transmission control protocol/Internet protocol (TCP/IP), User Datagram Protocol (UDP), hypertext transfer protocol (HTTP), hypertext transfer protocol secure (HTTPS), simple mail transfer protocol (SMTP), file transfer protocol (FTP), etc. The data exchanged over the public network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the public network 110 can use custom and/or dedicated data communications technologies instead of, or in addition to, the ones described above.

A management client 130 is a computer (or set of computers) that can communicate (indirectly) with an on-premise application (OPA) regarding the OPA's account information (e.g., in order to manage the OPA's accounts and/or use the OPA's accounts to perform delegated authentication). A management client 130 indirectly communicates with the OPA by communicating with the management server 120, which then communicates with the agent 160 (over the firewall 140), which then communicates with the agent/OPA interface 170, which then communicates with the OPA device 180 on which the OPA is installed.

A management client 130 communicates with the management server 120 using an API module or a user interface (UI) module (not shown). A UI module requires user interaction, while an API module does not. In one embodiment, regardless of which module is used, a management client 130 sends the management server 120 a request that adheres to the HTTP or HTTPS ("HTTP/S") protocol, and the management server 120 sends the management client 130 a response that adheres to the HTTP/S protocol. In one embodiment, when a management client 130 uses an API module, the HTTP/S messages include JavaScript Object Notation (JSON) data.

A UI module enables a user to receive information (e.g., displayed on a screen) and provide user input (e.g., using an input device). A management client 130 that uses a UI module can be, for example, a desktop computer, a laptop computer, a tablet computer, or a smart phone. The user of such a management client 130 is, for example, a system administrator in charge of managing the OPA's accounts and/or using the OPA's accounts to perform delegated authentication. In one embodiment, when a management client 130 uses a UI module, the HTTP/S messages include HTML data.

In one embodiment, the UI module is a dedicated application configured to communicate with the management server 120. In another embodiment, the UI module is a general-purpose web browsing application that sends HTTP/S requests, receives HTTP/S responses, and displays HTML files. In this embodiment, the user interface (UI) is a web page (e.g., HTML file) displayed by the web browser. Specifically, the web browser sends an HTTP/S request to the management server 120, receives an HTTP/S response that includes a web page in the body portion, and displays that web page.

In one embodiment, the UI is a single portal that provides access to multiple OPAs (e.g., to manage the OPAs' accounts and/or use the OPAs' accounts to perform delegated authentication). The portal enables a user to access the OPAs separately or as a group. For example, the portal enables a user to specify a particular OPA and then communicate with only that OPA. In one embodiment, the portal includes a graphical user interface (GUI) element for each OPA (e.g., a button), and the user activates one of these GUI elements to specify a particular OPA. As another example, the portal enables a user to specify multiple OPAs and then communicate with the multiple OPAs using a single command (e.g., to create an account for the same user in each OPA). In one embodiment, the portal includes an on/off GUI element (e.g., a checkbox) for each OPA and an "administration" GUI element (e.g., a button) that the user activates to communicate with whichever OPAs are "on" (e.g., checked).

In one embodiment, the management client 130 provides credentials (e.g., a user name and password) to the management server 120. The management server 120 uses these credentials to authenticate the management client 130. The URL to which the management client 130 sends the HTTP/S request can also be used by the management server 120 for authentication purposes. A single enterprise (e.g., the enterprise associated with the inside firewall portion 144) can have multiple on-premise applications (OPAs) and agents 160. In one embodiment, the UI that is presented on the management client 130 by the UI module is customized by the management server 120 based on the authentication credentials that are sent from the management client 130 to the management server 120.

A management client 130 can be located outside the firewall 140 as management client 130A or inside the firewall 140 as management client 130B. While only one outside-firewall management client 130A and only one inside-firewall management client 130B are shown in the embodiment depicted in FIG. 1, other embodiments can have multiple outside-firewall management clients 130A and/or multiple inside-firewall management clients 130B. Multiple management clients 130 can be useful, for example, when multiple users (or one user with multiple devices) need to communicate with the management server 120.

The management server 120 is a computer (or set of computers) that responds to a check-in communication received from an agent 160. The management server's response concerns managing an OPA's accounts and/or using an OPA's accounts to perform delegated authentication. In one embodiment, the management server 120 also stores "actions" for later use. An action is generated based on, for example, instructions received from a management client 130 or rule-based processing performed by the management server 120.

In one embodiment, the firewall 140 is configured to reject unsolicited incoming network traffic (e.g., a message sent from the management server 120 to the agent 160). However, the management server 120 can still send actions to the agent 160. This is achieved by sending the actions in response to a communication received from the agent 160 (e.g., a check-in communication). Specifically, the check-in communication sent from the agent 160 to the management server 120 uses a communication that is permitted to pass through the firewall 140 without being blocked by the firewall. In one embodiment, the check-in communication is a web query (e.g., HTTP/S request). The firewall 140 is configured to allow subsequent communications (e.g., HTTP/S responses) that are related to previous web queries. For example, the firewall 140 allows the management server 120 to respond to the request from the agent 160, as long as the response is related to a previous web query sent from the agent 160 to the management server 120. This response to a request originating from the agent 160 inside the firewall 140 is permitted by the firewall and, thus, permits actions to be received at the agent 160 from the management server 120. In this way, actions can be sent from the management server 120 to the agent 160 without requiring modification of the firewall 140.

While only one management server 120 is shown in the embodiment depicted in FIG. 1, other embodiments can have multiple management servers 120. Multiple management servers 120 can be useful, for example, to provide high availability and to handle additional management clients 130 and/or agents 160. The management server 120 is further described below with reference to FIGS. 3 and 6. Also, the management server 120 is somewhat similar to the services management server 108, 508, 910, and 1052 described in U.S. patent application Ser. No. 12/943,842.

The private network 150 represents the communication pathway between the firewall 140, the management client 130B, the agent 160, the agent/OPA interface 170, and the OPA device 180. The private network 150 is similar to the public network 110 except the private network is inside the firewall 140, while the public network is outside the firewall 140. The private network 150 is a trusted and secure network (e.g., internal to a particular enterprise).

The agent 160 is a computer (or set of computers) that sends a check-in communication to the management server 120, receives an action from the management server 120 over the firewall 140, and sends an OPA interface request to the agent/OPA interface 170. The action received from the management server 120 includes a portion that adheres to a standardized format and concerns managing an OPA's accounts and/or using the OPA's accounts to perform delegated authentication. The OPA interface request sent to the agent/OPA interface 170 corresponds to the action and includes the standardized portion While only one agent 160 is shown in the embodiment depicted in FIG. 1, other embodiments can have multiple agents 160. Multiple agents 160 can be useful, for example, to provide high availability and to handle additional agent/OPA interfaces 170. The agent 160 is further described below with reference to FIGS. 4 and 6. Also, the agent 160 is somewhat similar to the services management agent 500, 902, and 1050 described in U.S. patent application Ser. No. 12/943,842.

The agent/on-premise application (OPA) interface 170 is a computer (or set of computers) that receives an OPA interface request from the agent 160, translates the OPA interface request to a format that a particular OPA can understand (e.g., commands that adhere to that OPA's application programming interface (API)), and communicates with the OPA device 180 accordingly. Specifically, the agent/OPA interface 170 communicates with the OPA that is installed on the OPA device 180, thereby causing the OPA to fulfill the OPA interface request. The OPA interface request received from the agent 160 includes a portion that adheres to a standardized format and concerns managing an OPA's accounts and/or using the OPA's accounts to perform delegated authentication.

While only one agent/OPA interface 170 is shown in the embodiment depicted in FIG. 1, other embodiments can have multiple agent/OPA interfaces 170. Multiple agent/OPA interfaces 170 can be useful, for example, to provide high availability and to handle additional OPA devices 180. The agent/OPA interface 170 is further described below with reference to FIGS. 5 and 6.

Figure 2:
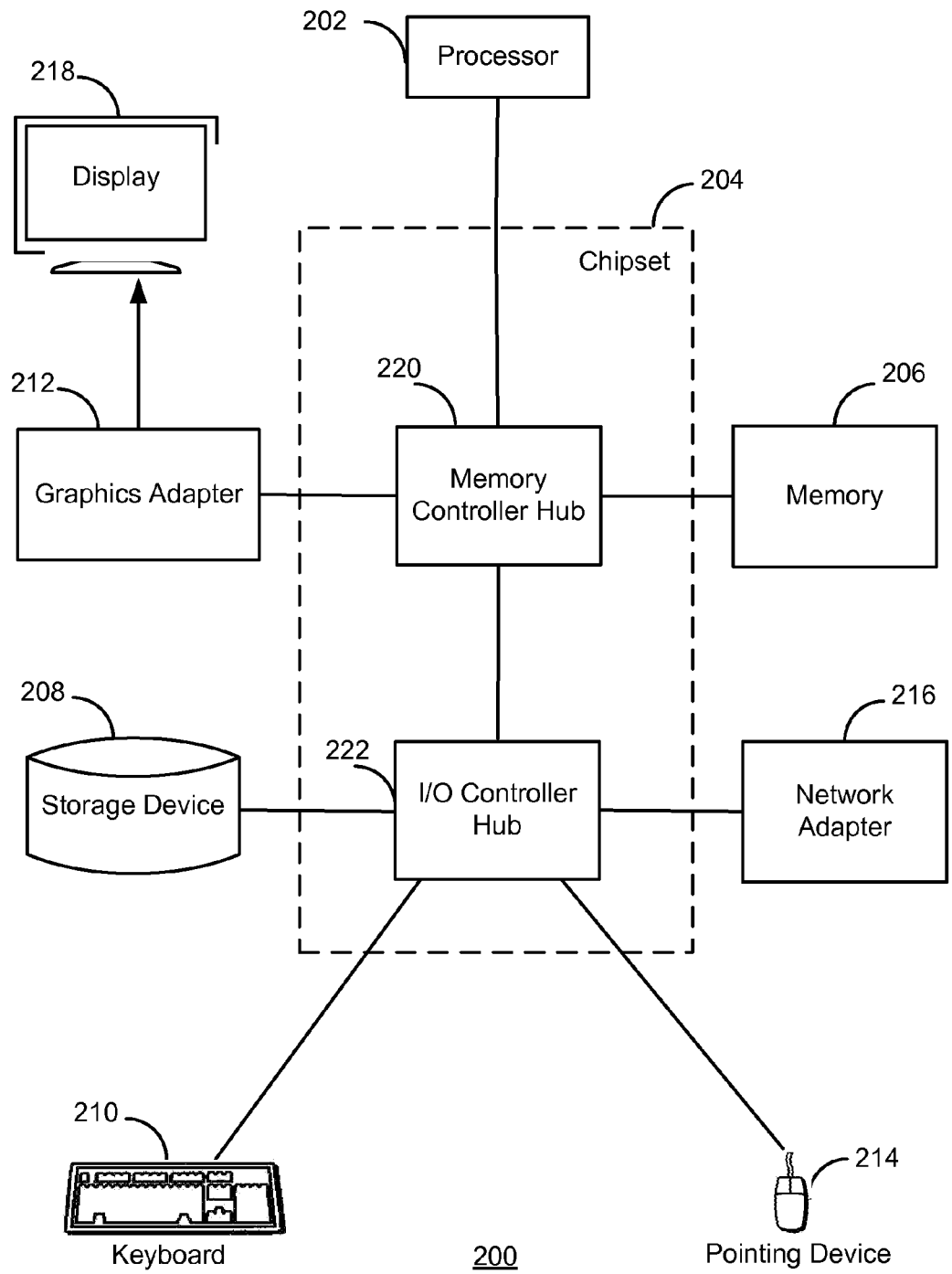
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the management server 120, the firewall 140, the agent 160, the agent/OPA interface 170, and/or the OPA device 180 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
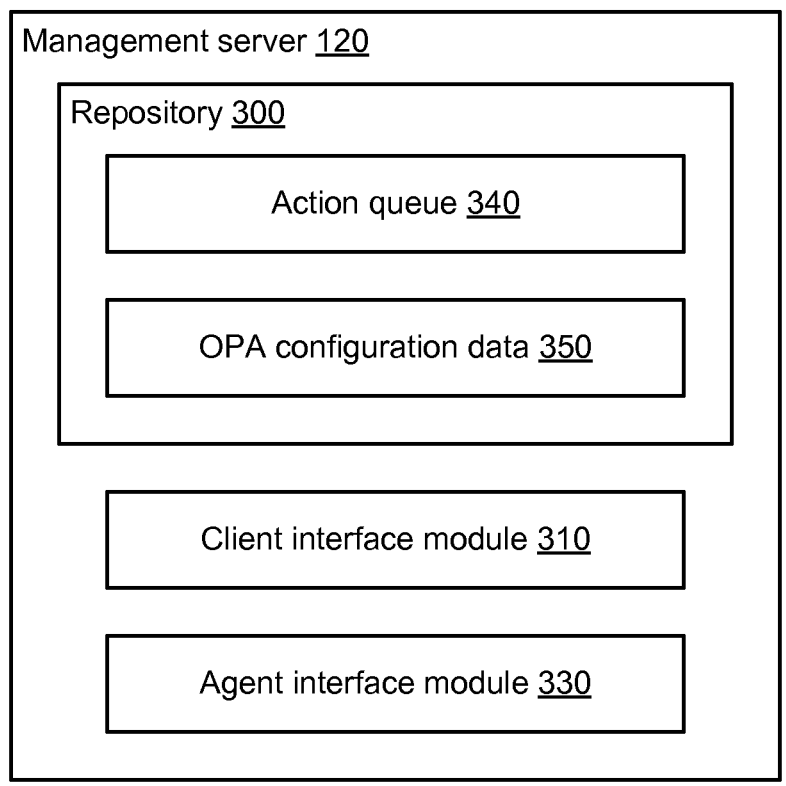
FIG. 3 is a high-level block diagram illustrating the management server from FIG. 1, according to one embodiment.

FIG. 3 is a high-level block diagram illustrating the management server 120 from FIG. 1, according to one embodiment. The management server 120 responds to a check-in communication received from an agent 160. The management server's response concerns managing an OPA's accounts and/or using an OPA's accounts to perform delegated authentication. The management server 120 includes a repository 300, a client interface module 310, and an agent interface module 330. The repository 300 stores an action queue 340 and configuration data for one or more OPAs 350.

The action queue 340 stores "actions" (specifically, actions that have not yet been sent to an agent 160, also referred to as "pending" actions). An action concerns an OPA's account information (e.g., managing the OPA's accounts and/or using the OPA's accounts to perform delegated authentication). In one embodiment, an action is generated based on instructions received from a management client 130 (e.g., instructions to provision an OPA account). In another embodiment, an action is generated based on rule-based processing performed by the management server 120 (e.g., an existing third-party account is added to a particular group, which triggers an OPA account to be provisioned). In one embodiment, an action is a data structure that includes various fields. Table 1 shows the fields included in an action, according to one embodiment.

TABLE 1

Action Fields

| Field Name | Field Description |
| --- | --- |
| Command Name | Examples include createUser, updateUser (includes (de)activation), getUsers (returns all users), getUser (returns particular user), deleteUser, createGroup, updateGroup, getGroups (returns all groups), getGroup (returns particular group), and deleteGroup. Used to generate an OPA interface request. |
| OPA-Specific Connection Data | Includes location of the relevant agent/OPA interface 170. Used to direct an OPA interface request. Can also include location of the relevant agent 160, location of the relevant OPA device 180, and/or authentication information needed to access the OPA's account information. This field is populated using information stored in OPA configuration data 350. |
| Customizable Agent Behavior Variables | Optional. Controls the agent 160 re: how to request data. (Ultimately affects the translation performed by the agent/OPA interface 170.) For example, if executing the command will result in receiving many pages of user records, this value can specify how many records to request with each page of data. Enables the behavior of an agent 160 to be changed at runtime without requiring configuration changes or software installation. |
| Command Argument Data | Data that the OPA needs in order to execute the command (e.g., user profile data is needed in order to execute a command that |

TABLE 1-continued

Action Fields

| Field Name | Field Description |
|---|---|
| | provisions a new account). Used to generate an OPA interface request. Type of data is command-specific. Adheres to a standardized format. In one embodiment, the standardized format is System for Cross-domain Identity Management (SCIM). |

Configuration data for an on-premise application (OPA) 350 includes location information (e.g., an IP address or URL) for that OPA's agent/OPA interface 170. In one embodiment, configuration data for an OPA 350 also includes location information for that OPA's agent 160, location information for the OPA device 180 on which that OPA is installed, and/or authentication information (e.g., an administrator user name and administrator password) that is needed in order to access the OPA's account information.

The client interface module 310 sends information to and receives information from a management client 130. In one embodiment, the client interface module 310 is a web server that receives HTTP/S requests and sends HTTP/S responses. If the management client 130 uses an API module, then the HTTP/S responses can include JSON data in the body portion.

If the management client 130 uses a UI module, then the HTTP/S responses can include web pages (e.g., HTML data) in the body portion. Specifically, the client interface module 310 sends a user interface to the management client 130 that enables a user to specify one or more OPAs for accessing the OPAs' account information. The client interface module 310 receives from the management client 130 instructions specifying one or more OPAs for accessing the OPAs' account information. The client interface module 310 then enables the user to access the OPAs' account information (e.g., in order to manage the OPAs' accounts and/or use the OPAs' accounts to perform delegated authentication).

The client interface module 310 receives from a management client 130 instructions regarding managing that OPA's accounts and/or using that OPA's accounts to perform delegated authentication. The client interface module 310 generates one or more "actions" based on the received instructions and stores the generated actions in the action queue 340 for later use.

The agent interface module 330 receives a check-in communication from an agent 160, determines how to respond to the check-in communication, and responds accordingly. In one embodiment, determining how to respond to the check-in communication comprises determining whether any actions are present in the action queue 340. If no actions are present in the action queue 340, then the agent interface module 330 responds by indicating that to the agent 160 (e.g., by sending a message to the agent 160 that says "no actions"). If an action is present in the action queue 340, then the agent interface module 330 responds by sending that action to the agent 160 and removing that action from the action queue 340. Note that the agent interface module 330 is able to reply to the agent 160 over the firewall 140 via a commonly-permitted firewall communication, as explained above with reference to management server 120. Additional data and/or status information can be exchanged between the agent 160 and the management server 120 as needed, depending on the action that was sent. The specific number of exchanges and/or specific pieces of information exchanged depends upon the specific action.

Figure 4:
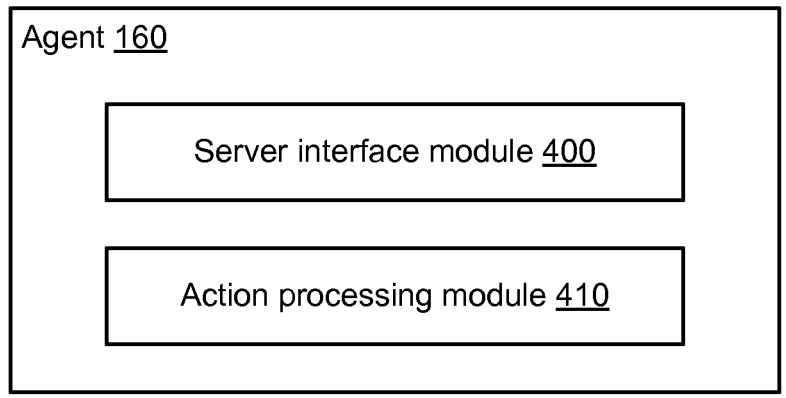
FIG. 4 is a high-level block diagram illustrating the agent from FIG. 1, according to one embodiment.

FIG. 4 is a high-level block diagram illustrating the agent 160 from FIG. 1, according to one embodiment. The agent 160 receives an action from the management server 120, generates an OPA interface request based on the received action, and sends the generated OPA interface request to the agent/OPA interface 170. The agent 160 includes a server interface module 400 and an action processing module 410. In one embodiment, during the agent installation process, the agent 160 is configured with a subdomain (associated with the domain of the third-party management server 120) that corresponds to a particular enterprise (e.g., "myenterprise.thirdparty.com"), a username, and a password. The management server 120 then verifies the authentication credentials, generates a token, and sends the token to the agent 160. The agent 160 then registers itself with the management server 120 using the token. In response, the management server 120 sends the agent 160 its own unique ID. The agent 160 uses the subdomain and the unique ID to generate a URL (e.g., "https://myenterprise.thirdparty.com/api/internal/v1/connector/action/{agentId}".

The server interface module 400 sends a check-in communication to the management server 120 and receives an action from the management server 120 over the firewall 140. In one embodiment, a check-in communication is a commonly-permitted firewall communication, such as a web query or an HTTP/S request, that includes the agent's token (received from the management server 120 during the agent installation process). The HTTP/S request is sent to the URL generated by the agent 160. Since the URL includes the subdomain and the unique ID, sending the HTTP/S request to that URL notifies the management server 120 regarding which enterprise and which agent 160 are associated with the request. In one embodiment, the management server 120 uses the token to verify the agent 160 and its credentials. In one embodiment, the server interface module 400 sends check-in communications to the management server 120 according to a specified frequency (e.g., once every five minutes).

The action received from the management server 120 concerns managing an OPA's accounts and/or using the OPA's accounts to perform delegated authentication. The received action includes a portion that adheres to a standardized format (e.g., the Command Argument Data field adheres to SCIM format).

The action processing module 420 executes an action received from the management server 120. In general, executing an action causes the action processing module 420 to generate an OPA interface request based on the received action and send the OPA interface request to an agent/OPA interface 170. For example, the action processing module 420 generates an OPA interface request that includes the standardized portion of the received action (e.g., the Command Argument Data field). In one embodiment, the OPA interface request is a SCIM representational state transfer (REST) request that includes the action's Command Name field, the action's Command Argument Data field, and the action's OPA-Specific Connection Data field (or a portion thereof). The action processing module 420 analyzes the received action (specifically, the OPA-Specific Connection Data field) to determine an agent/OPA interface 170. The action processing module 420 then sends the OPA interface request to that agent/OPA interface 170.

Executing the action received from the management server 120 can include returning status and/or data to the management server. For example, if the action is to synchronize user account information, then the synchronization at the OPA might cause accounts to be created, deleted, and/or modified (e.g., changed passwords or permissions). In this situation, the OPA might return information regarding any newly-created, newly-deleted, and/or newly-modified accounts. The OPA device 180 can send this information to the agent/OPA interface 170, which can then send the information to the agent 160, which can then send the information to the management server 120. Depending upon the particular action, executing the action may warrant one or more additional communications between the management server 120 and the agent 160.

Figure 5:
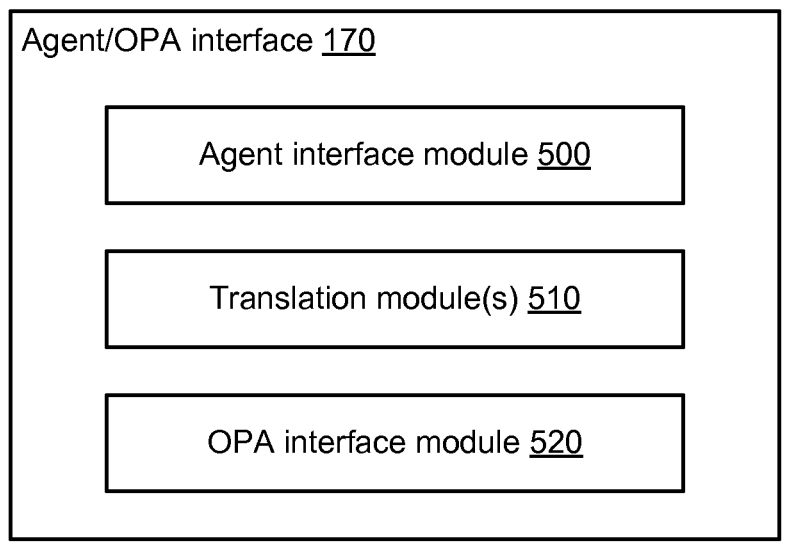
FIG. 5 is a high-level block diagram illustrating the agent/on-premise application (OPA) interface from FIG. 1, according to one embodiment.

FIG. 5 is a high-level block diagram illustrating the agent/on-premise application (OPA) interface 170 from FIG. 1, according to one embodiment. The agent/OPA interface 170 includes an agent interface module 500, translation modules for one or more on-premise applications (OPAs) 510, and an OPA interface module 520. The agent/OPA interface 170 receives an OPA interface request from the agent 160, translates the OPA interface request to a format that a particular OPA can understand (e.g., commands that adhere to that OPA's application programming interface (API)), and communicates with the OPA device 180 accordingly The agent interface module 500 receives an OPA interface request from an agent 160. The received OPA interface request concerns managing an OPA's accounts and/or using the OPA's accounts to perform delegated authentication. In one embodiment, the received OPA interface request is a SCIM representational state transfer (REST) request. The agent interface module 500 then uses the translation module for an on-premise application (OPA) 510 to translate the received OPA interface request to a format that the OPA can understand (e.g., commands that adhere to the OPA's API).

A translation module for an on-premise application (OPA) 510 translates an OPA interface request to a format that the OPA can understand (e.g., commands that adhere to the OPA's API). In one embodiment, the translation module includes two portions: a simplification portion and an OPA-specific portion. The simplification portion processes the OPA interface request and exposes a simpler interface for software developers (who are tasked with creating the OPA-specific portion). The OPA-specific portion implements that simpler interface using a format that the OPA can understand (e.g., commands that adhere to the OPA's API). Note that the simplification portion is generic with respect to the OPA and can be reused for all OPAs.

Consider an OPA interface request that is a SCIM REST request. The complete SCIM REST protocol supports 13 different operations across users, groups, and other metadata. Also, implementing the SCIM REST protocol requires knowledge of REST conventions, HTTP/S authentication conventions, and the SCIM data model. Without the simplification portion, the OPA-specific portion would have to implement the entire SCIM REST protocol in OPA format. With the simplification portion, the OPA-specific portion needs to implement only the simpler interface exposed by the simplification portion. As a result, the simplification portion removes the need for developers to learn and understand all of the SCIM-related technologies. In one embodiment, the simpler interface is a Java interface that includes only 11 methods: createUser, updateUser (includes (de)activation), getUsers (returns all users), getUser (returns particular user), deleteUser, createGroup, updateGroup, getGroups (returns all groups), getGroup (returns particular group), deleteGroup, and UserManagementCapabilities (returns all user management capabilities that the OPA-specific portion has implemented).

The OPA interface module 520 communicates with an OPA in a format that the OPA can understand (e.g., commands that adhere to the OPA's API). Specifically, the OPA interface module 520 communicates with the OPA that is installed on the OPA device 180 based on the translated received OPA interface request, thereby causing the OPA to fulfill the OPA interface request. The OPA interface module 520 has access to information regarding the location of the relevant OPA device 180 (e.g., contained within the OPA interface request).

Figure 6:
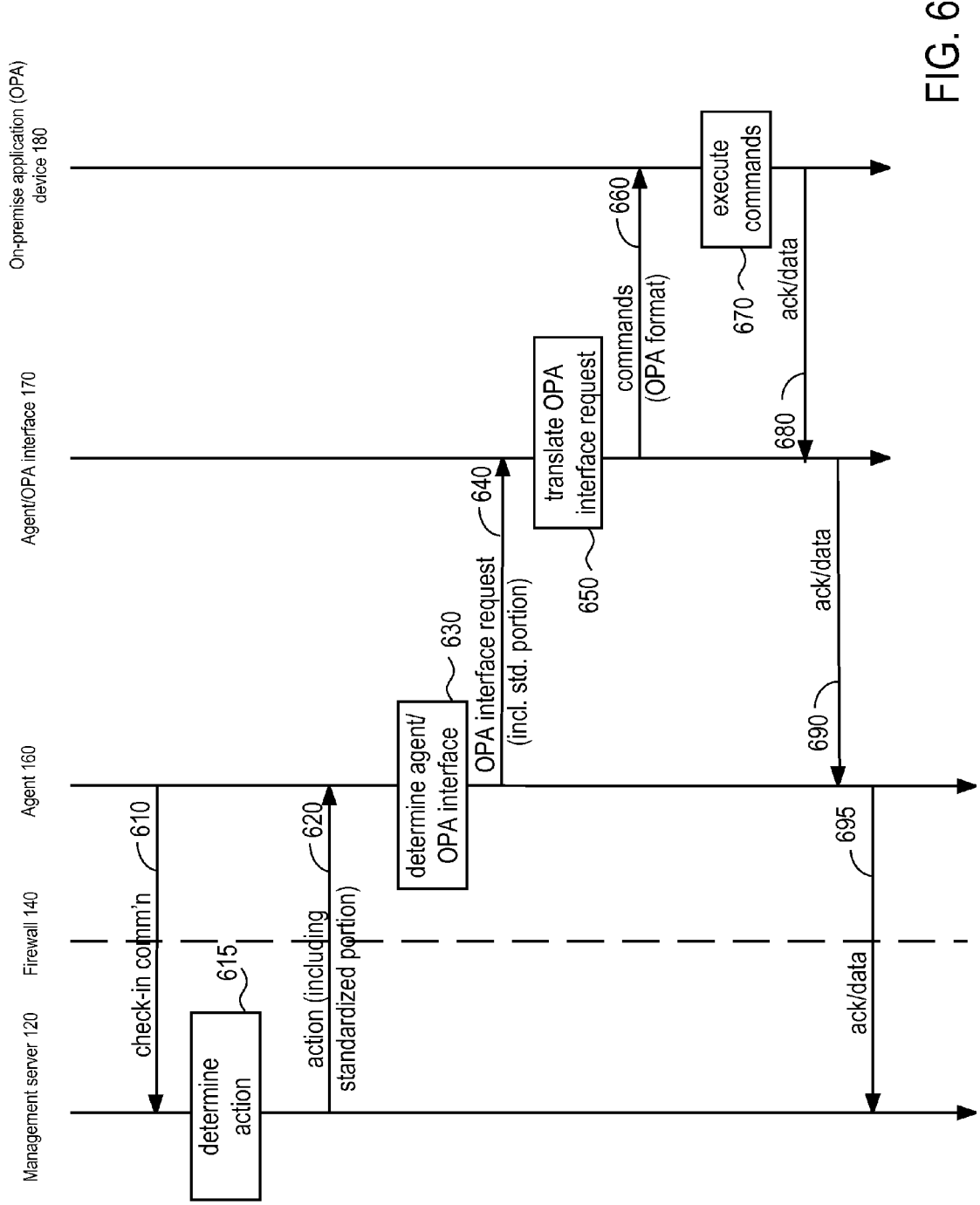
FIG. 6 is a sequence diagram illustrating steps involved in communicating over a firewall with a software application regarding a user account according to an extensible framework, according to one embodiment.

FIG. 6 is a sequence diagram illustrating steps involved in communicating over a firewall with a software application regarding a user account according to an extensible framework, according to one embodiment. Before the sequence starts, an action has already been stored in the action queue 340. The action concerns managing a particular OPA's accounts and/or using the particular OPA's accounts to perform delegated authentication. The action was generated based on, for example, instructions received from a management client 130 or rule-based processing performed by the management server 120.

In step 610, a check-in communication is sent from an agent 160 to a management server 120. For example, this is performed by the server interface module 400. The check-in communication indicates which enterprise and which agent 160 are associated with the request.

In step 615, the management server 120 determines an action to send to the agent 160. For example, this is performed by the agent interface module 330.

In step 620, an action is sent from the management server 120 to the agent 160. For example, this is performed by the agent interface module 330. The action includes a portion that adheres to a standardized format.

In step 630, the agent 160 determines a particular agent/OPA interface 170. For example, this is performed by the action processing module 410.

In step 640, an OPA interface request is sent from the agent 160 to the particular agent/OPA interface 170. For example, this is performed by the action processing module 410. The OPA interface request includes a portion that adheres to a standardized format.

In step 650, the agent/OPA interface 170 translates the OPA interface request to a format that the OPA can understand (e.g., commands that adhere to the OPA's application programming interface (API)). For example, this is performed by a translation module 510.

In step 660, the agent/OPA interface 170 communicates with the OPA device 180 (based on the translated OPA interface request). Specifically, the agent/OPA interface 170 communicates with the OPA that is installed on the OPA device 180. For example, this is performed by the OPA interface module 520.

In step 670, the OPA (installed on the OPA device 180) executes the commands, thereby fulfilling the OPA interface request.

In step 680, an acknowledgement and/or additional data is sent from the OPA (installed on the OPA device 180) to the agent/OPA interface 170.

In step 690, an acknowledgement and/or additional data is sent from the agent/OPA interface 170 to the agent 160.

In step 695, an acknowledgement and/or additional data is sent from the agent 160 to the management server 120.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for communicating over a firewall, the method comprising:
sending, periodically, a check-in communication to a management server located outside the firewall, the check-in communication indicating an agent/OPA interface associated with the check-in communication;
receiving an action from the management server, wherein the action includes a standardized portion that adheres to a standardized format and concerns user account information maintained by an on-premise software application ("OPA") installed on a device located inside the firewall;
generating an OPA interface request based on the action, wherein the OPA interface request relates to user accounts of the OPA and includes the standardized portion; and
sending the OPA interface request to the agent/OPA interface configured to communicate with the device.

2. The method of claim 1, wherein the action further concerns managing a user account of the user accounts of the OPA or using the user account to perform delegated authentication.

3. The method of claim 1, wherein the check-in communication comprises a web query.

4. The method of claim 1, wherein the standardized portion includes information that the OPA needs to execute a command.

5. The method of claim 1, wherein the standardized format is System for Cross-domain Identity Management (SCIM).

6. The method of claim 1, wherein the OPA interface request comprises a System for Cross-domain Identity Management (SCIM) representational state transfer (REST) request.

7. The method of claim 1, wherein the OPA interface request comprises a location of the device on which the OPA is installed.

8. The method of claim 1, wherein the OPA interface request comprises authentication information needed to access the user account information.

9. The method of claim 1, wherein the action further includes a portion that identifies the agent/OPA interface.

10. A non-transitory computer-readable storage medium storing computer program modules for communicating over a firewall, the computer program modules executable to perform steps comprising:
sending, periodically, a check-in communication to a management server located outside the firewall, the check-in communication indicating an agent/OPA interface associated with the check-in communication;
receiving an action from the management server, wherein the action includes a standardized portion that adheres to a standardized format and concerns user account information maintained by an on-premise software application ("OPA") installed on a device located inside the firewall;
generating an OPA interface request based on the action, wherein the OPA interface request relates to user accounts of the OPA and includes the standardized portion; and
sending the OPA interface request to the agent/OPA interface configured to communicate with the device.

11. The computer-readable storage medium of claim 10, wherein the action further concerns managing a user account of the user accounts of the OPA or using the user account to perform delegated authentication.

12. The computer-readable storage medium of claim 10, wherein the standardized portion includes information that the OPA needs to execute a command.

13. The computer-readable storage medium of claim 10, wherein the standardized format is System for Cross-domain Identity Management (SCIM), and wherein the OPA interface request comprises a SCIM representational state transfer (REST) request.

14. The computer-readable storage medium of claim 10, wherein the OPA interface request comprises a location of the device on which the OPA is installed.

15. The computer-readable storage medium of claim 10, wherein the OPA interface request comprises authentication information needed to access the user account information.

16. The computer-readable storage medium of claim 10, wherein the action further includes a portion that identifies the agent/OPA interface.

17. A computer system for communicating over a firewall, comprising:
a non-transitory computer-readable storage medium storing computer program modules executable to perform steps comprising:
sending, periodically, a check-in communication to a management server located outside the firewall, the check-in communication indicating an agent/OPA interface associated with the check-in communication;
receiving an action from the management server, wherein the action includes a standardized portion that adheres to a standardized format and concerns user account information maintained by an on-premise software application ("OPA") installed on a device located inside the firewall;
generating an OPA interface request based on the action, wherein the OPA interface request relates to user accounts of the OPA and includes the standardized portion; and
sending the OPA interface request to the agent/OPA interface configured to communicate with the device; and
a computer processor for executing the computer program modules.

* * * * *